US012081670B1

(12) United States Patent
Taware et al.

(10) Patent No.: US 12,081,670 B1
(45) Date of Patent: Sep. 3, 2024

(54) VALIDATION OF ELECTRONIC DOCUMENT USING DISTRIBUTED LEDGERS

(71) Applicant: Citigroup Technology, Inc., New York, NY (US)

(72) Inventors: Suvarna Prashant Taware, Pune (IN); Kamlesh Kumar Shewani, Pune (IN); Gaurav Santosh Kothari, Pune (IN)

(73) Assignee: CITIGROUP TECHNOLOGY, INC., New York, NY (US)

( * ) Notice: Subject to any disclaimer, the term of this patent is extended or adjusted under 35 U.S.C. 154(b) by 0 days.

(21) Appl. No.: 18/537,060

(22) Filed: Dec. 12, 2023

(51) Int. Cl.
*H04L 9/32* (2006.01)
(52) U.S. Cl.
CPC .................. *H04L 9/3213* (2013.01)
(58) Field of Classification Search
CPC ....................................................... H04L 9/3213
USPC .......................................................... 713/159
See application file for complete search history.

(56) References Cited

U.S. PATENT DOCUMENTS

2020/0162266 A1\* 5/2020 Miller .................. H04L 9/3239
2021/0334802 A1\* 10/2021 Zhang ..................... G06F 21/64

\* cited by examiner

*Primary Examiner* — Jeffrey C Pwu
*Assistant Examiner* — Nega Woldemariam
(74) *Attorney, Agent, or Firm* — Foley & Lardner LLP

(57) ABSTRACT

Presented herein are system and methods for validating electronic documents. A first server having one or more processors coupled with memory may identify an electronic document of a customer device. The first server may validate a record of the electronic document in accordance with a consensus algorithm by communicating associated data to a plurality of second servers. The first server may generate a token using the electronic document in response to the plurality of second servers successfully validating the record of the electronic document. The first server may append the record of the electronic document corresponding to the token to the plurality of records on a distributed ledger. The first server may generate an instruction to store the token on a wallet of the customer device to authorize the use of the electronic document across the plurality of second servers.

18 Claims, 9 Drawing Sheets

VALIDATION OF ELECTRONIC DOCUMENT USING DISTRIBUTED LEDGERS

TECHNICAL FIELD

This application generally relates to validation of electronic documents. In particular, the present application relates to validating electronic documents for use across different service providers.

BACKGROUND

Identity validation methods for electronic documents or other data may face fragmentation across various entities and applications, leading to operational inefficiencies. Additionally, identity validation may lack a unified platform, with many different entities and applications employing distinct mechanisms for validation. This lack of uniformity and centralization may expose entities to heightened security risks, including the potential misuse of sensitive data. Furthermore, because of the lack of uniformity, a user attempting to use an electronic document validated by one entity may not be able to use the validation with another entity, resulting in the electronic document having to be validated multiple times. In addition, even for a single entity or application, the validation may be particular to a jurisdiction or region, making it further difficult to use a validated document across different jurisdictions. This leads to an excess consumption of computing resources in processing the validation of the electronic documents and of network bandwidth in communicating data in connection with the validation.

SUMMARY

Presented herein are systems and methods for validating electronic documents. To address these and other challenges, a document validation service can maintain a distributed ledger (e.g., a private blockchain) to progressively build a repository of validated customer information, to establish a global identity (e.g., in the form of a non-fungible token (NFT)) for customers across various entities. The global identity can overcome border limitations to facilitate international service access. The validation process can involve a set of participant nodes (or trusted entities), creating a shared trust validation system that is also fault tolerant. The service can share encrypted validation status of individuals with other members, based on user consent, to safeguard data privacy. The service can also receive real-time updates from issuing authorities to reflect any changes. To ensure data consistency, the system can incorporate a periodic reconciliation mechanism.

The service can provide a global identity wallet for client devices. The wallet can store all validated credentials and maintain a trail of all actions taken on customer data, providing the user with complete control over their data exposure. User associated with the client devices can also have the ability to stop or decline transactions at any time. Various entities can be a part of participant nodes, with real-time access to validation and data tampering attempts. To further secure data, the document validation system can assign a unique encryption key to each organization, preventing data theft among entities. The validated documents can be stored as non-fungible tokens (NFTs) in the wallet of the client device.

By utilizing distributed ledger technology, the document validation system may enhance the security and integrity of user data. Users may be provided with a global identity wallet, enabling such users to fully control their personal information and transaction activities. Security in the validation service may be further strengthened by assigning unique encryption keys to each participating entity and storing validated documents as NFTs in the user's wallet.

Furthermore, since the document validation system provides access to the distributed ledger to check for a validation status of a document, the document validation service may eliminate or reduce an electronic document from having to repeatedly undergo validation from multiple different entities. With the elimination of repeated validation checks, the document validation service may reduce the consumption of computing resources and network bandwidth that would have otherwise been used in the repeated validation checks. In addition, from a human-computer interaction (HCI) perspective, the user of the client device may be freed from inputting data associated with the validation of the electronic document with each entity. With the participating entities able to rely on the validation on the distributed ledger, the user may be also free to use the electronic document once validated with the different entities.

Aspects of the present disclosure are directed to systems, methods, and non-transitory computer-readable media for validating electronic documents. A first server may identify an electronic document of a customer device to be validated. The first server may validate a record of the electronic document to be appended to a plurality of records on a distributed ledger in accordance with a consensus algorithm by communicating associated data to a plurality of second servers. The first server may generate a token using the electronic document in response to the plurality of second servers successfully validating the record of the electronic document. The first server may append the record of the electronic document corresponding to the token to the plurality of records on the distributed ledger. The first server may generate an instruction to store the token on a wallet of the customer device to authorize the use of the electronic document across the plurality of second servers.

In some embodiments, the first server may determine that the electronic document complies with a rule set defined for at least one of a location, an association, or the customer device. In response to determining that the electronic document complies with the rule set, the first server may send the data associated with the electronic document to the plurality of second servers for validation. In some embodiments, the first server may receive a selection criterion for validation of the electronic document from the customer device. The first server may select from a plurality of third servers, the plurality of second servers with which to communicate based on the selection criterion provided by the customer device.

In some embodiments, the first server may determine that the electronic document does not correspond to any of the plurality of records of the distributed ledger. The first server may initiate validation of the electronic document from the customer device in response to determining that the electronic document does not correspond to any of the plurality of records of the distributed ledger. In some embodiments, the first server may identify the electronic document corresponding to a second record of the plurality of records of the distributed ledger as stale based on a time of addition of the second record to the distributed ledger. The first server may initiate validation of the electronic document from the customer device in response to identifying the electronic document as stale.

In some embodiments, the first server may refrain from generating the token in response to a failure to validate the electronic document. The first server may send an indication of the failure to validate the electronic document to the customer device. In some embodiments, the first server may generate a respective key to decrypt encrypted data of the electronic document for each of the plurality of second servers. The first server may store the respective key to decrypt for each of the plurality of second servers on a database.

In some embodiments, the first server may determine that a second electronic document corresponds to a second record of the plurality of records of the distributed ledger. The first server may send an indication of a validation status for the electronic document identified by the second record. In some embodiments, communicating with the plurality of second servers may further include sending to each of the plurality of second servers the data, including at least one of the following: (i) a key to decrypt the electronic document; (ii) an identifier of the electronic document; and (iii) a signature generated by the first server for the electronic document. In some embodiments, the process of generating the instruction may further include sending the instruction to store the token on the wallet. The customer device may use the token to access a resource on at least one of the plurality of second servers associated with the electronic document.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Figure 1:
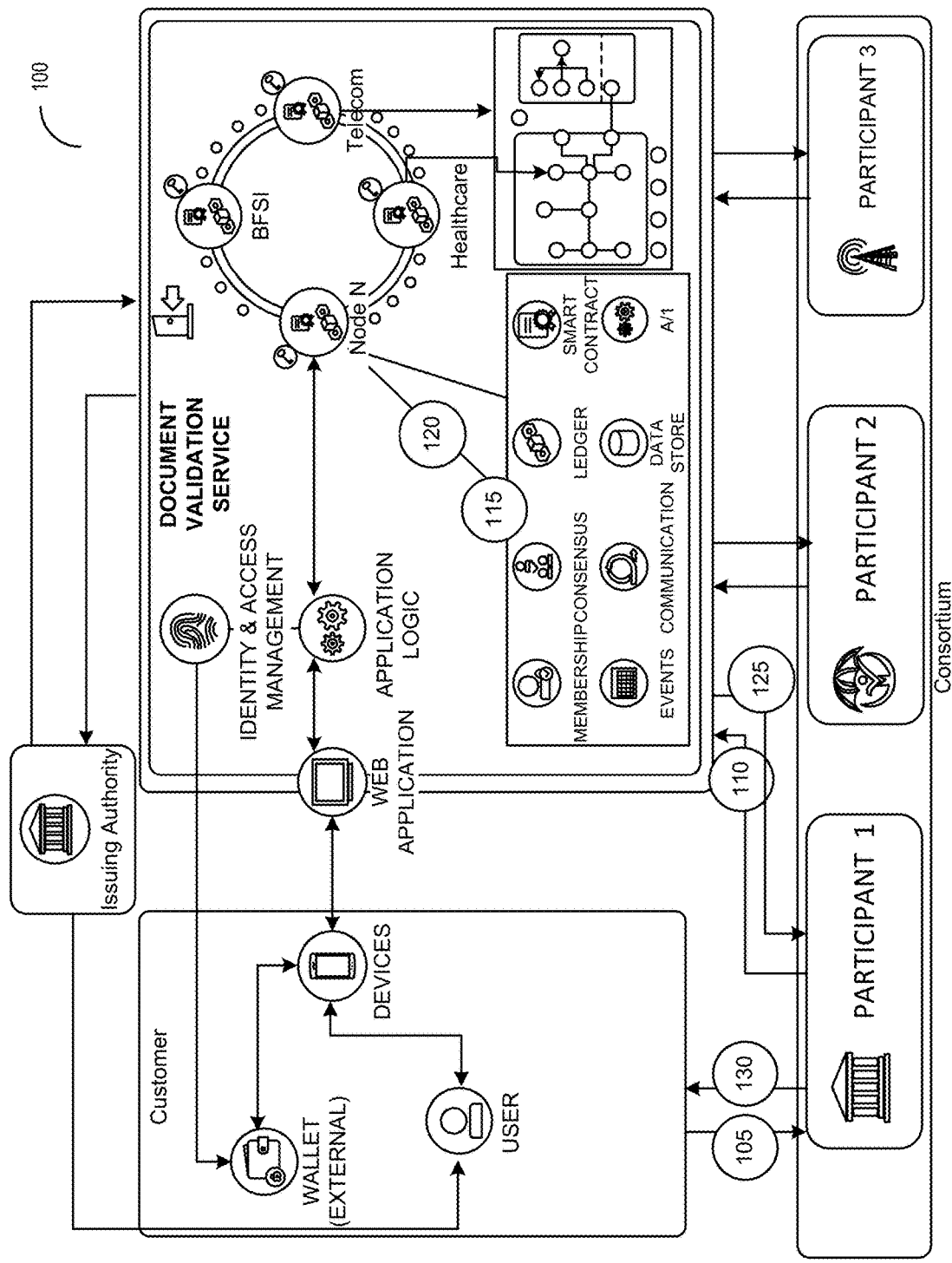
FIG. 1 illustrates a flow diagram of an example process for electronic document validation via a consortium blockchain network in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of electronic document validation. In particular, the present disclosure relates to validating electronic documents for use across different service providers using a distributed ledger. Upon receiving an electronic document from a customer device, a server may perform an initial compliance check of the electronic document against the rules applicable to a specific jurisdiction, organization, or user. After the initial compliance check, the server can send a proposal to a set of peer participants (e.g., nodes) in a consortium (e.g., those associated with the service providers) to perform document validation in accordance with a consensus algorithm for the distributed ledger. The proposal may include an identifier of the electronic document and a signature, among others. The peer participants may then perform document validation, consulting the issuing authority as required. Subsequent validations may also be conducted within the consortium network. Once the proposal is validated by the peer participants, the server can append a validation record of the electronic document to the distributed ledger. Additionally, the system may involve the validation of customer identification and electronic documents, storing them as non-fungible tokens (NFTs) in a customer wallet. The validated information in these NFTs can be used by service providers for compliance purposes.

FIG. 1 depicts a flow diagram of an example process 100 for electronic document validation via a consortium blockchain network. The process 100 may include several operations (operations 110-135) to be performed by a document validation service and one or more participating nodes in a consortium. The process 100 may include more or fewer operations than depicted herein. Under the process 100, in operation 105, a participating node (e.g., participant 1) may receive an electronic document from a customer device for validation. At operation 110, the participating node may forward the electronic document from the customer device to the document validation service.

At operation 115, the document validation service may perform an initial compliance check of the electronic document against the rules applicable to a specific jurisdiction, organization, or user. After performing the initial compliance check, the document validation service may send a prepared message to other peer participants (e.g., second servers) in a consortium network. The prepared message may include a decryption key, a document ID, and an organization signature, among others.

In operation 120, the document validation service may decrypt the document identifier. The document validation service may also communicate the decrypted document identifier with the set of participating nodes. All the peer participant nodes may validate the electronic document (e.g., according to a consensus algorithm), and send the consensus result back to the document validation service (e.g., the source server). The document validation service may receive the consensus result, indicating that consensus has been achieved and that a majority of peer participants have accepted the proposal.

Upon successful validation, the document validation service may append the record of the electronic document to a distributed ledger. the document validation service may generate a unique identifier (e.g., in the form of an NFT) referencing the validated record of the electronic document on the distributed ledger. In operation 125, the document validation service may provide results of the validation of the electronic document to the participant node. In operation 130, the participant node may send an instruction to the customer device to store the unique identifier on a wallet (e.g., a NFT wallet). The user can use the unique identifier stored in the customer's device to provide access a validated document.

Figure 2:
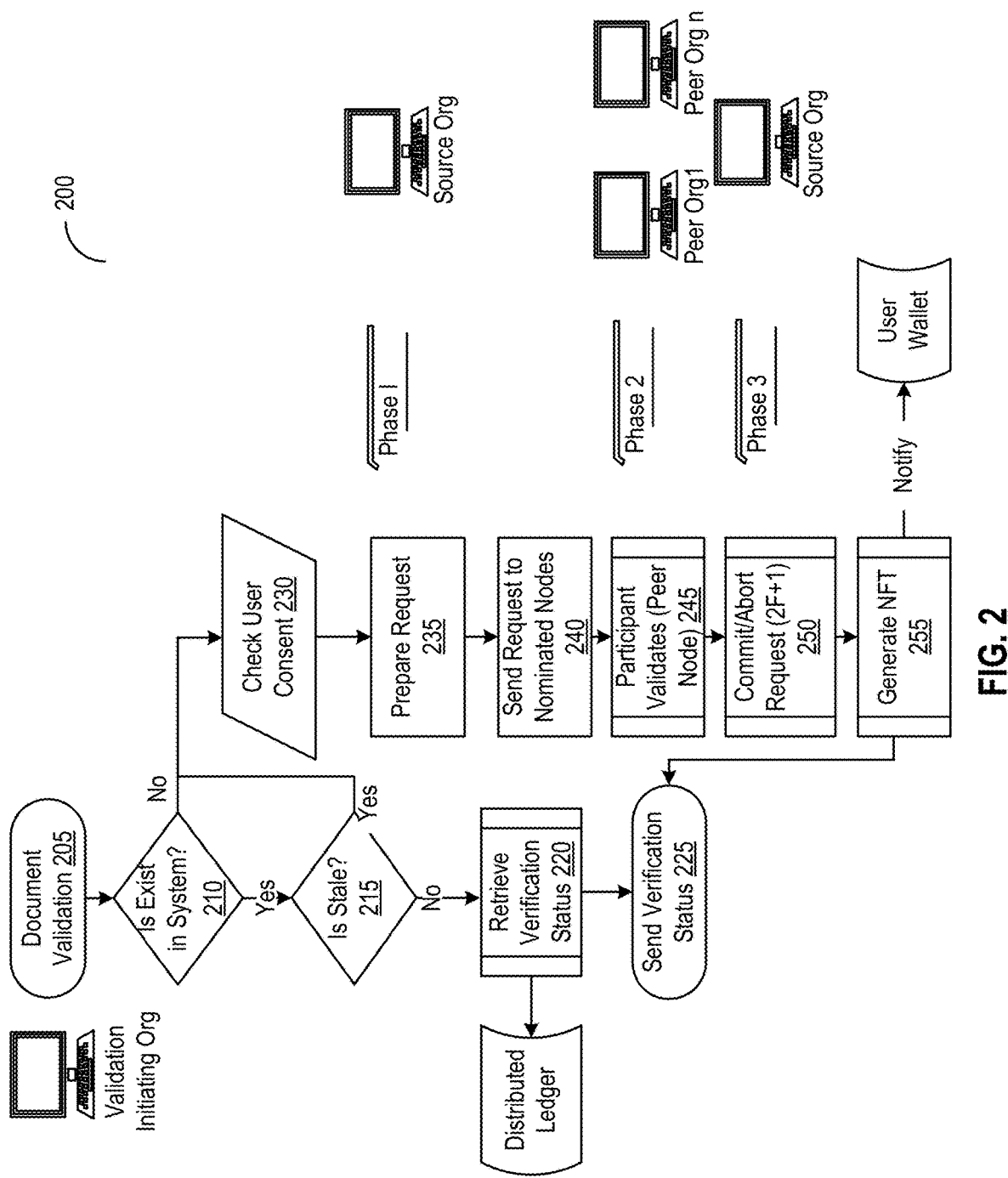
FIG. 2 illustrates a flow diagram of an example process for validating electronic documents to provide enhanced security and user control in a document validation system in accordance with an embodiment.

FIG. 2 depicts a flow diagram of an example process 200 for electronic document validation via a consortium blockchain network. The process 200 may include several operations (operations 210-255) to be performed by a document validation service and one or more participating nodes. The process 200 may include more or fewer operations than depicted herein. Under the process 200, in operation 205, the document validation service may receive an electronic document from a customer device for validation. The document validation service then may perform an initial compliance check of the electronic document against the rules applicable to a specific jurisdiction, organization, or user.

In operation 210, the document validation service may determine whether the validation of the electronic document exists in a distributed ledger. In operation 215, if the validation of the electronic document exists in the distributed ledger, the document validation service may determine whether the validation is stale based on the time of record addition to the distributed ledger. In operation 220, if the validation is not stale, the document validation service may retrieve the verification status of the electronic document from the distributed ledger. In operation 225, the document validation service sends the verification status of the electronic document to the customer device. However, if the validation of the electronic document does not exist in the distributed ledger, or if the verification status of the electronic document is stale, the validation process may be divided into several phases, as described herein.

In operation 230 (e.g., phase 1), the document validation service checks for user consent with the consensus partner (s). In operation 235, the document validation service (e.g., the source organization) may prepare or generate a request. The request may include a decryption key, a document ID and an organization signature, among others. In operation 240, the document validation service may send the prepared request to nominated peer participants (e.g., second servers or nodes) in a consortium network based on user consent. In operation 245 (e.g., phase 2), the peer participants may decrypt the document ID and validate it with the issuing authorities. Additionally, all peer participants may validate the electronic document.

In operation 250 (e.g., phase 3), the document validation service may receive the consensus result from the peer participants, indicating that consensus has been achieved and that a majority of peer participants have accepted the proposal. The document validation service then may append a validation record of the electronic document to the distributed ledger.

In operation 255, the document validation service may validate customer identification and the electronic document and store the validated identification and electronic document as an NFT in a user's wallet. Each validated document is stored as an NFT in the user's wallet, along with metadata such as the last validation date, validating organizations' signatures, document name, and owner name. Service providers can also use the token stored in the customer's device to access a validated document with the customer's consent.

Figure 3:
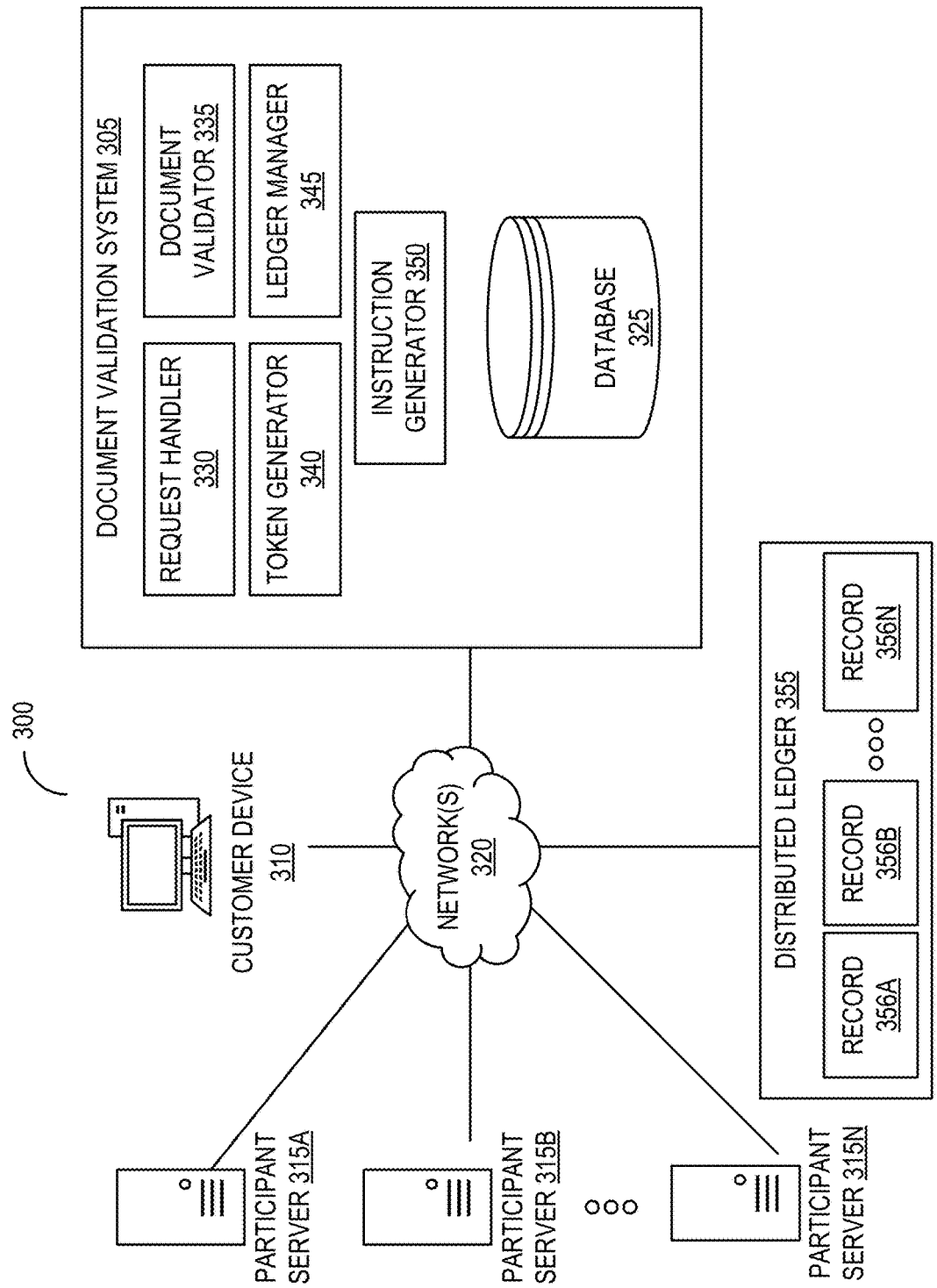
FIG. 3 illustrates a block diagram of an example system for electronic document validation in accordance with an embodiment.

FIG. 3 depicts a block diagram of a system 300 for validating electronic documents. The system 300 may include at least one document validation system 305, at least one customer device 310, and one or more participant servers 315A-N (hereinafter generally referred to as participant servers 315), coupled with one another via at least one network 320. The system 300 may include a distributed ledger 355, which can be integrated within the document validation system 305, or the distributed ledger 355 can be configured as an independent entity with which the document validation system 305 interacts. The distributed ledger 355 may include a sequence of records 356A-N (hereinafter generally referred to as a record 356). The document validation system 305 may include at least one request handler 330, at least one document validator 335, at least one token generator 340, at least one ledger manager 345, at least one instruction generator 350, and a database 325, among others.

Embodiments may comprise additional or alternative components or omit certain components from those of FIG. 3 and still fall within the scope of this disclosure. For example, the database 325 and the distributed ledger 355 may be integrated into a single integrated solution, or they may function as distinct entities. Various hardware and software components of one or more public or private networks 320 may interconnect the various components of the system 300. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The customer device 310 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The customer devices 310 can include one or more computing devices or servers that can perform various functions as described herein. The customer device 310 can include, but is not limited to, a mobile device (e.g., a smartphone, tablet, etc.), a personal computing device (e.g., a desktop, a laptop, etc.), or another type of computing device.

Each participant server 315 may be any computing device, including one or more processors coupled with memory and capable of performing the various processes and tasks described herein. The participant servers 315 are a set of independently operating computing devices (or nodes). Each of the participant servers 315 can execute its functions independently of the others. These functions may include transaction validation, data synchronization, and consensus achievement within a blockchain network. The blockchain network can be regarded as a distributed system operating across a user device and various organizational infrastructures. In this manner, one or more participant servers 315 can experience issues (e.g., fail to validate a transaction, synchronize data incorrectly, or perform below a quality threshold) without impacting the operation of other participant servers 315. The participant servers 315 can be independently monitored and maintained. In some embodiments, a set of participant servers 315 can be grouped, associated with, or defined in connection with carrying out specific tasks, supporting one or more blockchain applications, or managing a particular set of transactions, among others. The participant servers 315 may also send consensus outcomes or results to an initial source organization or a network monitoring service. In some embodiments, each participant server 315 may be an instance of the document validation system 305.

The document validation system 305 may be any computing device, including one or more processors coupled with memory (e.g., the database 325) and software, and capable of performing the various processes and tasks described herein. The document validation system 305 may be in communication with the customer device 310, the participant servers 315, the network 320, or the distributed ledger 355. Although shown as a single document validation system 305, the document validation system 305 may include any number of computing devices. The document validation system 305 may receive, retrieve, or otherwise include the consensus outcomes or results from the participant server 315A based on a user's consent or a customer's consent. In some embodiments, document validation system 305 may be an instance of the participant server 315.

The document validation system 305 includes several subsystems to perform the operations described herein. The document validation system 305 may include a request handler 330, a document validator 335, a token generator 340, a ledger manager 345, or an instruction generator 350. In some implementations, the request handler 330 may identify a receipt of a request from a customer device and process requests for the validation of electronic documents. The document validator 335 may communicate data associated with the electronic document to the participant servers 315 and receive a consensus result from them. The token generator 340 may generate a non-fungible token (NFT) using the electronic document. The ledger manager 345 may append a validation record of the electronic document to the distributed ledger 355. The instruction generator 350 may generate an instruction to store the token in a wallet of the customer device to authorize the use of the electronic document across various service providers. The document validation system 305 may also include a database 325, which can be managed and updated to store large amounts of data used for a wide range of applications.

The distributed ledger 355 may be a decentralized database maintained and updated by the document validation system 305 and the participant servers 315. In some embodiments, the distributed ledger 355 may be a private blockchain whose access is limited to the document validation system 305 and the participant servers 315. Each record 365 may correspond to or include a unit of information stored on the distributed ledger 355 and may include an identification or at least a portion of a previously validated electronic document. Each time a record 365 is to be added to the distributed ledger 355, the document validation system 305 and the participant servers 315 may communicate data with one another in accordance with a consensus algorithm (e.g., proof of authority (PoA), byzantine fault tolerance (BFT), and raft consensus). For example, the document validation system 305 may generate and send a proposal to the participant servers 315 to indicate that a new record 365 is to be added to the distributed ledger 355. Each of the nodes (e.g., the document validation system 305 and the participant servers 315) may independently perform a validation of the new record 365 and communicate a result of the validation with one another. When there is consensus among the participant nodes, the new record 365 may be added to the distributed ledger 355.

Figure 4:
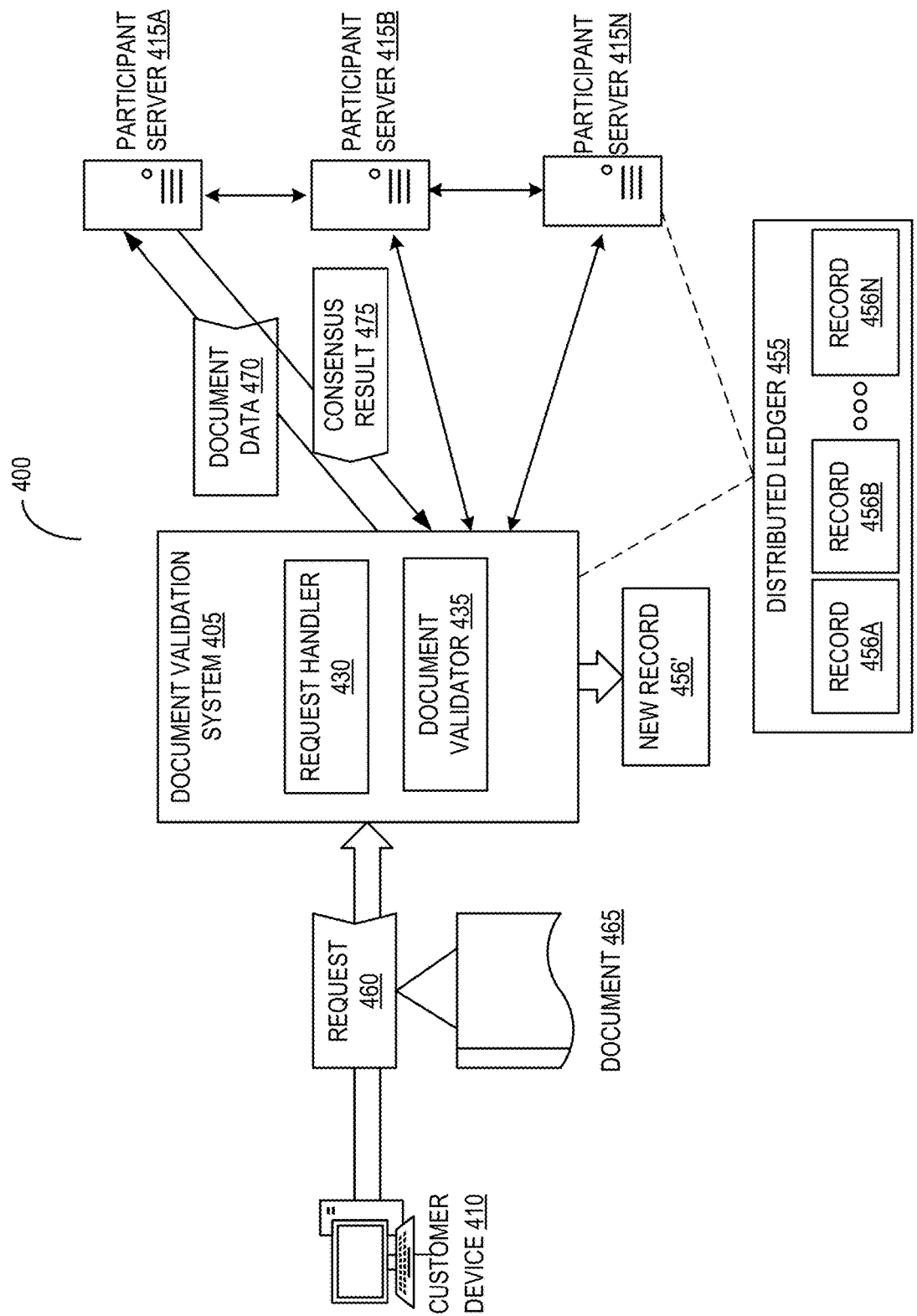
FIG. 4 illustrates a block diagram of an example system for communicating data associated with an electronic document to receive the consensus result from participant servers in accordance with an embodiment.

FIG. 4 depicts a block diagram of a system 400 for communicating data associated with an electronic document to participant servers. The system 400 may include a customer device 410, a document validation system 405 including a request handler 430 and a document validator 435, one or more participant servers 415A-N (hereinafter generally referred to as participant nodes 415), and a distributed ledger 455 including a set of records 456A-N (hereinafter generally referred to as records 456). The request handler 430 may retrieve, identify, or otherwise receive at least one request 460 from the customer device 410 (or customer devices). The request 460 may be to validate at least one electronic document 465. In some embodiments, the request handler 430 may receive the request 460 indirectly, from the customer device 410 via at least one of the participant servers 415. For example, the customer device 410 may send the request 460 to validate the electronic document 465 to the participant server 415A, and the participant server 415A may in turn forward the request to the document validation system 405.

With receipt, the request handler 430 may retrieve, extract, or otherwise identify the electronic document 465 from the request 460. The request 460 may include or identify the electronic document 465 associated with a user of the customer device 410. The electronic document 465 may be one or more files storing electronic media content (e.g., textual or image content). For example, the content of the electronic document 465 may include: identification documents; financial documents such as bank statements, tax reports, and credit reports; legal documents including contracts, legal agreements, and court orders; educational documents such as diplomas, degrees, certificates; business documents such as licenses and business permits; and government documents such as visas and residence permits, among others. The electronic document 465 may also include or be associated with a document identifier. The document identifier may reference the one or more files corresponding to the electronic document 465. In some embodiments, the electronic document 465 may be encrypted when received from the customer device 410 or the participant server 415.

In some embodiments, the request handler 430 may extract or identify other data included in the request 460. In some embodiments, the request 460 may include or identify metadata. The metadata may include, for example, an identifier of a location (e.g., country, province, region, state, county, municipality, or jurisdiction), an identifier of entity (e.g., an organization, association, or institution association with the electronic document 465), and an identifier of the customer device 410 (e.g., the user or the device itself), among others. The metadata may be associated with the electronic document 465. In some embodiments, the request 460 may identify or include a selection criterion for validation of the electronic document 465. The selection criterion may identify, define, or otherwise specify one or more participant servers 415 permitted to access data associated with the electronic document 465. The selection criterion may specify one or more participant servers 415 with which the document validation system 405 is to communicate when validating a new record of the electronic document 460. In some embodiments, the selection criteria may be received separately from the request 460 and the electronic document 465.

The document validator 435 may identify or determine whether the electronic document 465 is compliant with at least one rule set. The rule set may be, for example, part of an initial compliance checks on the electronic document 465. The initial compliance check may involve a comparison of the content of the electronic document 465 and other pertinent aspects against the rule set (e.g., maintained in a database) to determine adherence or compliance with a jurisdiction, an entity, or user specifications. In determining, the document validator 435 may select or identify the rule set to apply based on the metadata from the request 460 (or the electronic document 465). Upon identifying, the document validator 435 may check the contents of the electronic document 465 with the rule set.

If the contents do not satisfy the specifications of the rule set, the document validator 435 may determine that the electronic document 465 is not compliant with the rule set. The document validator 435 may send, provide, or otherwise transmit an indication of failure to validate the electronic document 465 to the customer device 410. In some embodiments, document validator 435 may send, provide, or otherwise transmit an indication of failure to validate the electronic document 465 to the participant server 415 via which the request 460 was sent. Otherwise, if the contents satisfy the specifications of the rule set, the document validator 435 may determine that the electronic document 465 is compliant with the rule set. The document validator 435 may determine to proceed with the validation process.

The document validator 435 may initiate verification or validation of at least one new record 456' associated with the electronic document 465 to be appended to the set of records 465 in the distributed ledger 455. In some embodiments, the document validator 435 may initiate the validation, when the electronic document 465 is determined to be compliant with the rule set. The new record 456' may correspond to the electronic document 465 and may include an identifier or at least a portion of data of the electronic document 465. At this stage, the new record 456' may yet to be generated. In some embodiments, the document validator 435 may identify or select one or more participant servers 415 with which to communicate as part of the validation, based on the selection criterion from the customer device 410. From the overall set of participant servers 415, the document validator 435 may select one or more participant servers 415 with which the document validation system 405 is to communicate when validating the new record 456' as identified in the selection criteria.

To validate, the document validator 435 may broadcast, transmit, or otherwise communicate document data 470 to the participant servers 415. In some embodiments, the participant servers 415 may be selected in accordance with the selection criteria. The validation of the new record 456' associated with the electronic document 465 may be in accordance with a consensus algorithm, such as a proof of authority (PoA), Byzantine Fault Tolerance (BFT), or Raft consensus protocol, among others. The document data 470 may correspond to a proposal to append the new record 456'. The document data 470 may include or identify, for example, an encryption key to decrypt the electronic document 465, an identifier of the electronic document 465, and a signature generated by the document validator 435 for the electronic document 465, among others. In some embodiments, the document validator 435 may provide, transmit, or otherwise send the encryption key to decrypt the electronic document 465, the identifier of the electronic document 465, or the signature generated by the document validator 435 for the electronic document 465, among others to each participant server 415.

In performing the validation, each participant server 415 may retrieve, identity, or otherwise receive the document data 470 from the document validation system 405. The participant servers 415 may identify or determine whether the new record 456' is to be validated based on the document data 470 (e.g., in accordance with the consensus algorithm). When the document data 470 is determined to valid, the participant server 415 may determine to validate the new record 456'. Conversely, when the document data 470 is determined to be invalid, the participant server 415 may determine to not validate the new record 456'. The participant server 415 may produce, output, or otherwise generate a consensus result 475 to indicate or identify whether the new record 456' is successfully validated. With the generation, participant server 415 may return, send, or otherwise transmit the consensus result 475 to the document validation system 405.

The document validator 435 may aggregate, collect, or otherwise receive the consensus result 475 from each of the participant servers 415. Upon receipt of the consensus result 475, the document validator 435 may identify or determine a number of consensus results 475 indicating that the new record 456' is successfully validated at each participant server 415. The document validator 435 may compare the number of consensus results 475 with successful validations with a threshold number. The threshold number may delineate, identify, or otherwise define a value (e.g., a majority) for the number of consensus results 475 at which to validate the new record 456'. If the number of consensus results 475 satisfies (e.g., greater than or equal to) the threshold number, the document validator 435 may determine that validation of the new record 456' is successful. On the other hand, if the number of consensus results 475 does not satisfy (e.g., less than) the threshold number, the document validator 435 may determine that the validation of the new record 456' has filed. In addition, the document validator 435 may transmit, provide, or otherwise send an indication of failure to validate the electronic document 465 to the customer device 410.

In some embodiments, the document validator 435 may create, output or otherwise generate a key to encrypt or decrypt the data of the electronic document 465 for each participant server 415. The generation of key may be in accordance with any number of cryptographic algorithms and may be performed when the electronic document 415 is successfully validated. Each key may be particular to a respective participant server 415 to be used to encrypt or decrypt the data. Upon generation, the document validator 435 may store and maintain the keys for the participant servers 415 on a database. In some embodiments, the document validator 435 may send the key to each respective participant server 415.

Figure 5:
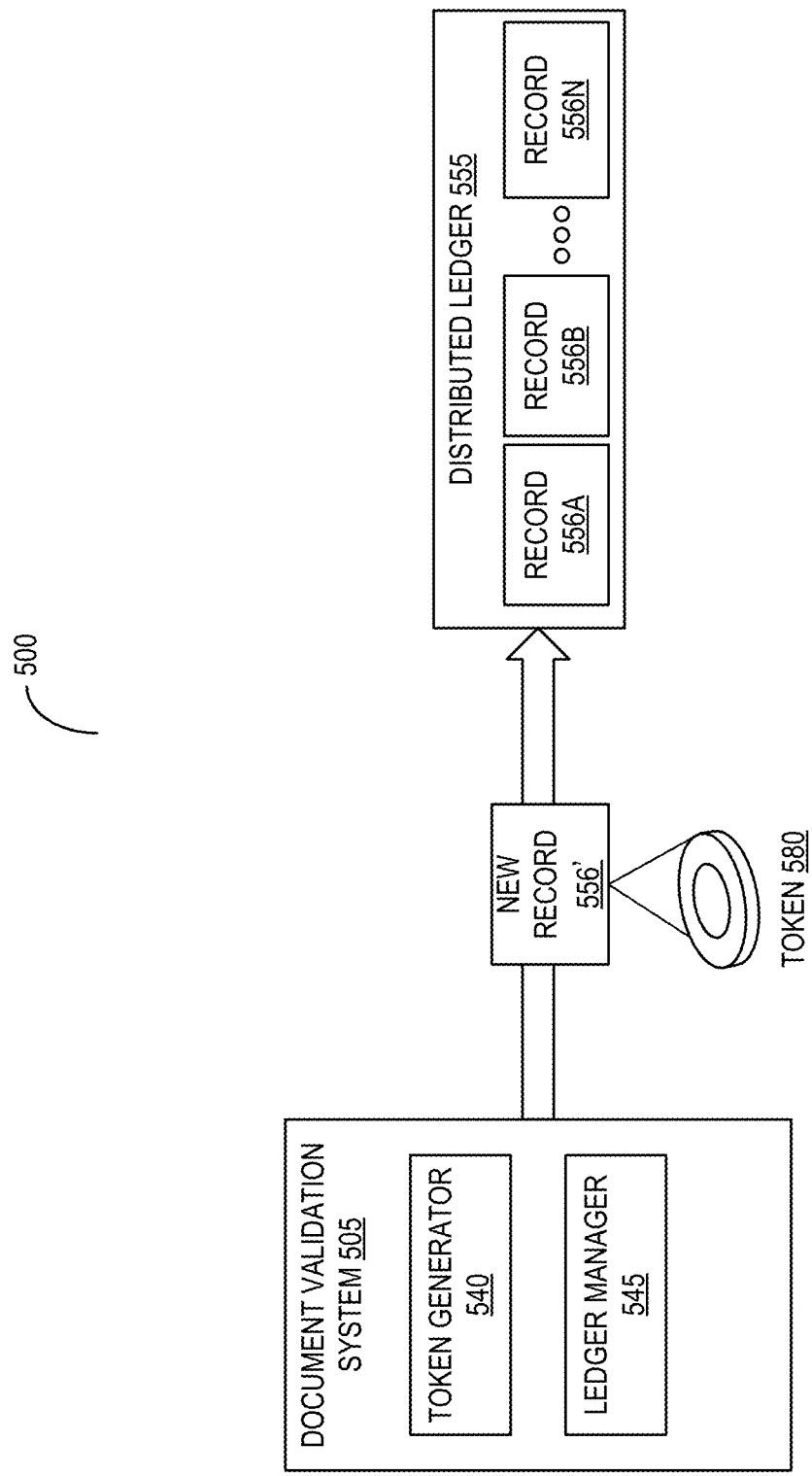
FIG. 5 illustrates a block diagram of an example system for generating a new record corresponding to a token and appending the record in accordance with an embodiment.

FIG. 5 depicts a block diagram of a system 500 generating a new record corresponding to a token and appending the new record. The system 500 may include a document validation system 505 (including a token generator 540 and a ledger manager 545) and a distributed ledger 555 including a set of records 556A-N (hereinafter generally referred to as records 556). In response to the participant servers successfully validating a new record 556' to be appended, the token generator 540 may create, write, or otherwise at least one token 580 using an electronic document. The electronic document may correspond to the new record 556'. The token 580 may uniquely identify the record 556 in the distributed ledger 555. In some embodiments, the token generator 540 may generate the token 580 in accordance with a non-fungible token (NFT) generation protocol (e.g., ERC-721 standard). The token 580 may be generated using at least a portion of the electronic document, such as the content, the identifier, or related metadata, among others. When the participant servers fail to validate the new record 556', the token generator 540 may refrain from generating the token 580. The token generator 540 may also transmit, provide, or otherwise send an indication of failure to validate the electronic document.

The token 580 may serve as a unique identifier for its respective record 556', distinguishing it from other tokens within a blockchain network. The token 580 may include unique attributes or identifier to the new record 556', such as a token identifier, a timestamp, record identifier, and ownership information, among others. For example, the token generator 540 may generate the token 580. In some implementations, the token generator 540 may also generate a timestamp for each new record 556' to provide a chronological record to maintain the transparency of the token's history. Similarly, in certain implementations, a record identifier may be generated as an additional unique identifier within the distributed ledger 555. The record identifier, also generated by the token generator 540 or another entity, may be assigned to facilitate efficient management and retrieval of the new record 556'.

In conjunction, the ledger manager 545 may create, produce, or otherwise generate the new record 556' of the electronic document. The generation of the new record 556' may use at least a portion of data from the electronic document. The new record 556' may identify or include the token 580 associated with the electronic document. In some embodiments, the new record 556' may itself be the token 580. With the generation, the ledger manager 545 may insert, add, or otherwise append the new record 556' to the set of records 556' in the distributed ledger 555. In appending, the ledger manager 545 may join or insert the new record 556' to the end of the set of records 556' in the distributed ledger 555. The appending of the new record 556'

Figure 6:
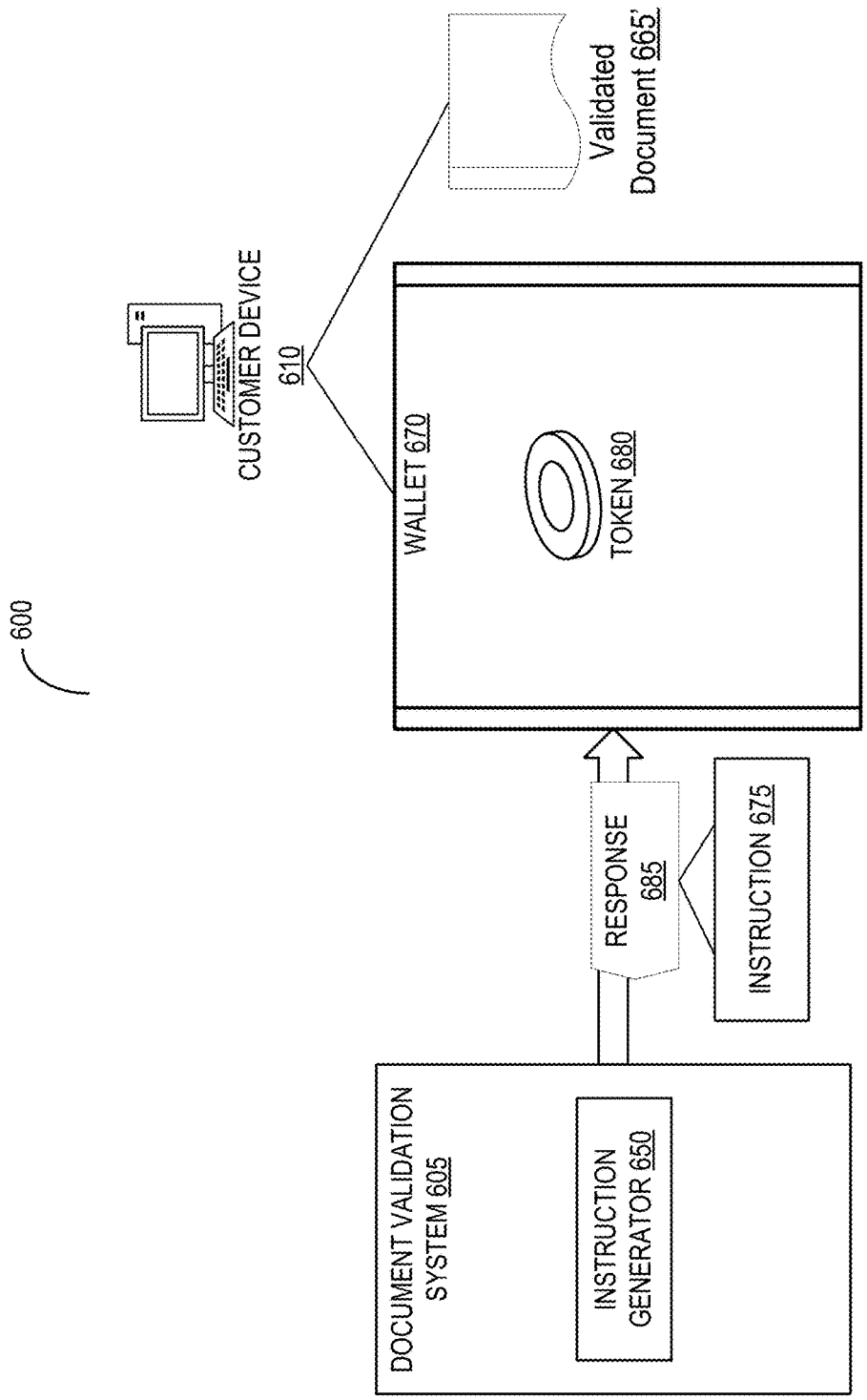
FIG. 6 illustrates a block diagram of an example system for generating an instruction to store a token in a wallet of a customer device in accordance with an embodiment.

FIG. 6 depicts a block diagram of a system 600 for generating an instruction to store a token in a wallet of a customer device. The system 600 may include a customer device 610, a document validation system 605 (including an instruction generator 650). The instruction generator 650 may create, produce, or otherwise generate at least one instruction 675 to store at least one token 680. The instruction 675 may be to store at least one token 680 on a wallet 670 of the customer device 610 to authorize the use of a validated document 665' across the participant servers. The instruction 675 may be a script specifying the storage and maintenance of the token 680 on the wallet 670. In some embodiments, the instructions generated by the instruction generator 650 may not only include the process of storing the token 680 but also directives for using the token 680 to access resources associated with the electronic document on participant servers or the distributed ledger. With the generation, the instruction generator 650 may transmit, provide, or otherwise send at least one response 685 including the instruction 675 to the customer device 610. In some embodiments, the instruction generator 650 may transmit the response 685 to the participant server via which the electronic document was received.

With receipt, the customer device 610 may store and maintain the token 680 on the wallet 670. The wallet 670 may be a secure and organized repository for storing and managing tokens to ensure the accessibility of digital assets, such as the token 680. The wallet 670 may be a device (separate from the customer device 610), a physical media, or a software used to store and maintain the token 680. In some embodiments, the wallet 670 may be a dedicated NFT wallet for storing and maintaining the token 680. Using specifications of the instruction 675, the customer device 610 may use the wallet 670 may keep track of, organize, and protect tokens. Upon storage, the customer device 610 may use the token 680 from the wallet 670 to use the validated document 665' with one or more of the participant servers.

Figure 7:
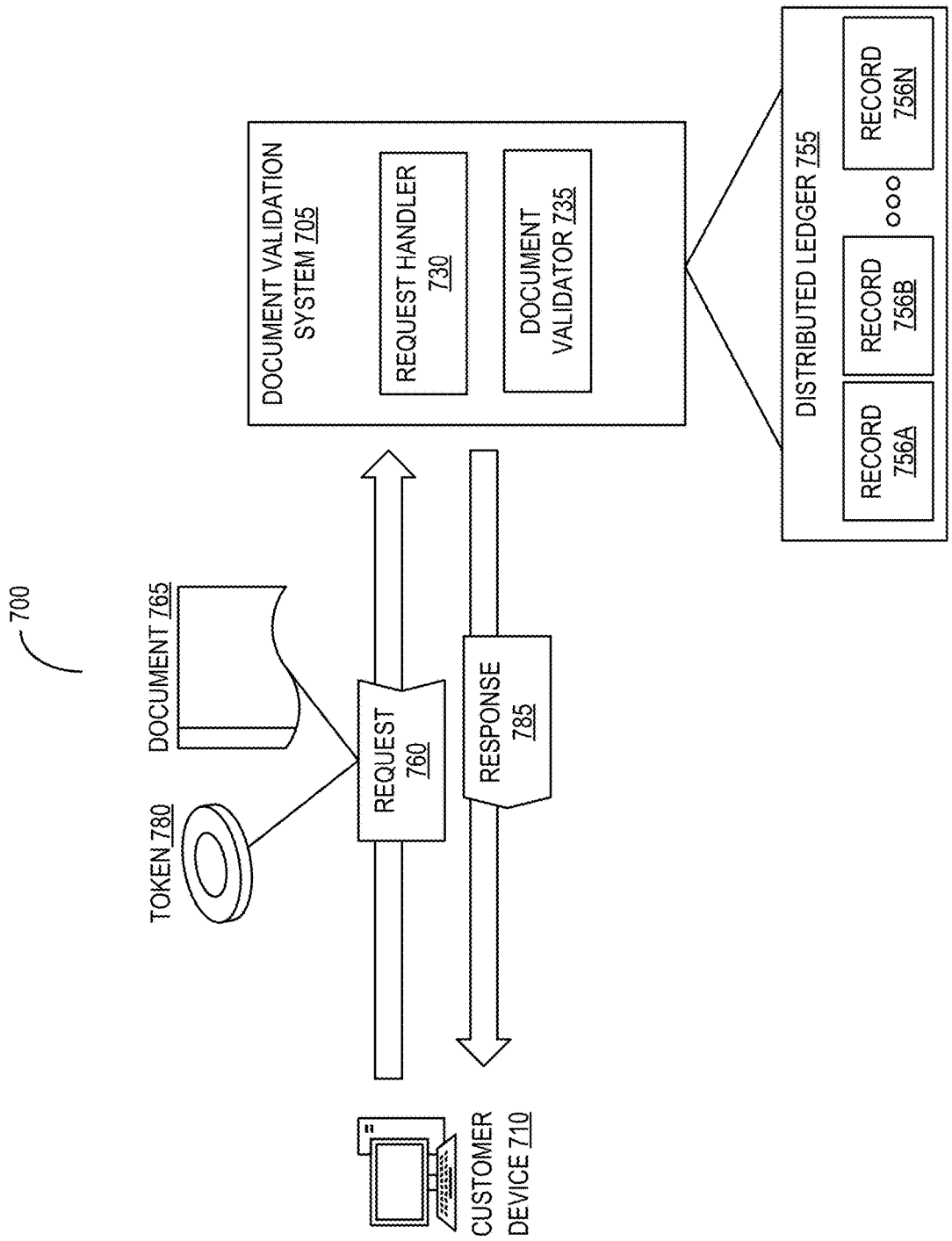
FIG. 7 illustrates a block diagram of an example system for using a token, stored in a customer device, to access a validated document in accordance with an embodiment.

FIG. 7 depicts a block diagram of a system 700 for using a token stored in a customer device. The system 700 may include a customer device 710, a document validation system 705 (including the request handler 730 and the document validator 735), and a distributed ledger 755 including a set of records 756A-N (hereinafter generally referred to as records 765). The request handler 730 may retrieve, identify, or otherwise receive at least one request 760 from the customer device 710 (or customer devices). The request 760 may be to use an electronic document 465 for various purposes with service providers or affiliated entities associated with the participant servers.

In some embodiments, the request handler 430 may receive the request 460 indirectly, from the customer device 410 via at least one of the participant servers 415. When participant servers (e.g., associated with service providers or affiliated entities) are to validate data from an electronic document 765, the participant server may also send a request to customer device 710 to provide a token 780. Responding to this request, the customer device 710 may return, send, or otherwise transmit the request 760 with the token 760. In some embodiments, the request 760 may identify or include the electronic document 765. In some implementations, the retrieval process of the token 780 from the customer device 710 may be governed by stringent security protocols, such as encryption, to prevent unauthorized access and safeguard the confidentiality of both the token 780 and the associated document. During this process, the token 780 may be encrypted with a specific cryptographic key, which can only be accessed and understood by authorized parties with the correct decryption key. Once the service providers have retrieved the token 780, they may extract the relevant information. For example, financial institutions may use the validated document associated with the token 780 to confirm the authenticity of financial documents. Similarly, legal firms could rely on these tokens to verify legal documents, while educational institutions might use them for academic credential verification, among others.

With receipt, the document validator 735 may identify or determine whether the electronic document 765 corresponds to one of the set of records 756 on the distributed ledger 755. In some embodiments, the document validator 735 may identify or determine whether the request 760 includes the token 780. When the request 760 lacks the token 780, the document validator 735 may determine that the electronic document 765 does not correspond to any of the records 756 on the distributed ledger 755. The document validator 735 may determine to initiate the validation of the electronic document 765 as detailed herein. Otherwise, the document validator 735 may use the token 780 of the electronic document 765 to determine whether any of the set of records 756 on the distributed ledger 455 corresponds to the electronic document 765.

When the token 780 of the electronic document 765 matches one of the records 765 on the distributed ledger 755, the document validator 735 may identify or determine whether the record 765 is stale. The determination may be based on a time of addition of the record 765 to the distributed ledger 755. To determine, the electronic document 765 may compare a time elapsed since the addition to a threshold time. The threshold time may identify, delineate, or define a value for the elapsed time at which to determine the record 765 as stale. When the elapsed time exceeds the threshold time, the document validator 735 may determine that the record 765 is stale. The document validator 735 may determine to initiate the validation of the electronic document 765 as detailed herein. Otherwise, when the elapsed time does not exceed the threshold time, the document validator 735 may determine that the record 765 is not stale.

The document validator 735 may retrieve, determine, or otherwise identify an indication of a validation state of the record 765. The validation state may be retrieved from the record 765 on the distributed ledger 755 and may identify whether the electronic document 765 is authorized to be used by the customer device 710 across the participant servers. In some embodiments, the validation state may identify which participant servers that the electronic document 765 is authorized to be used. With the identification, the document validator 735 may transmit, provide, or otherwise, send the indication. The sending of the indication may be in response to determining that the record 765 is not stale.

Figure 8A:
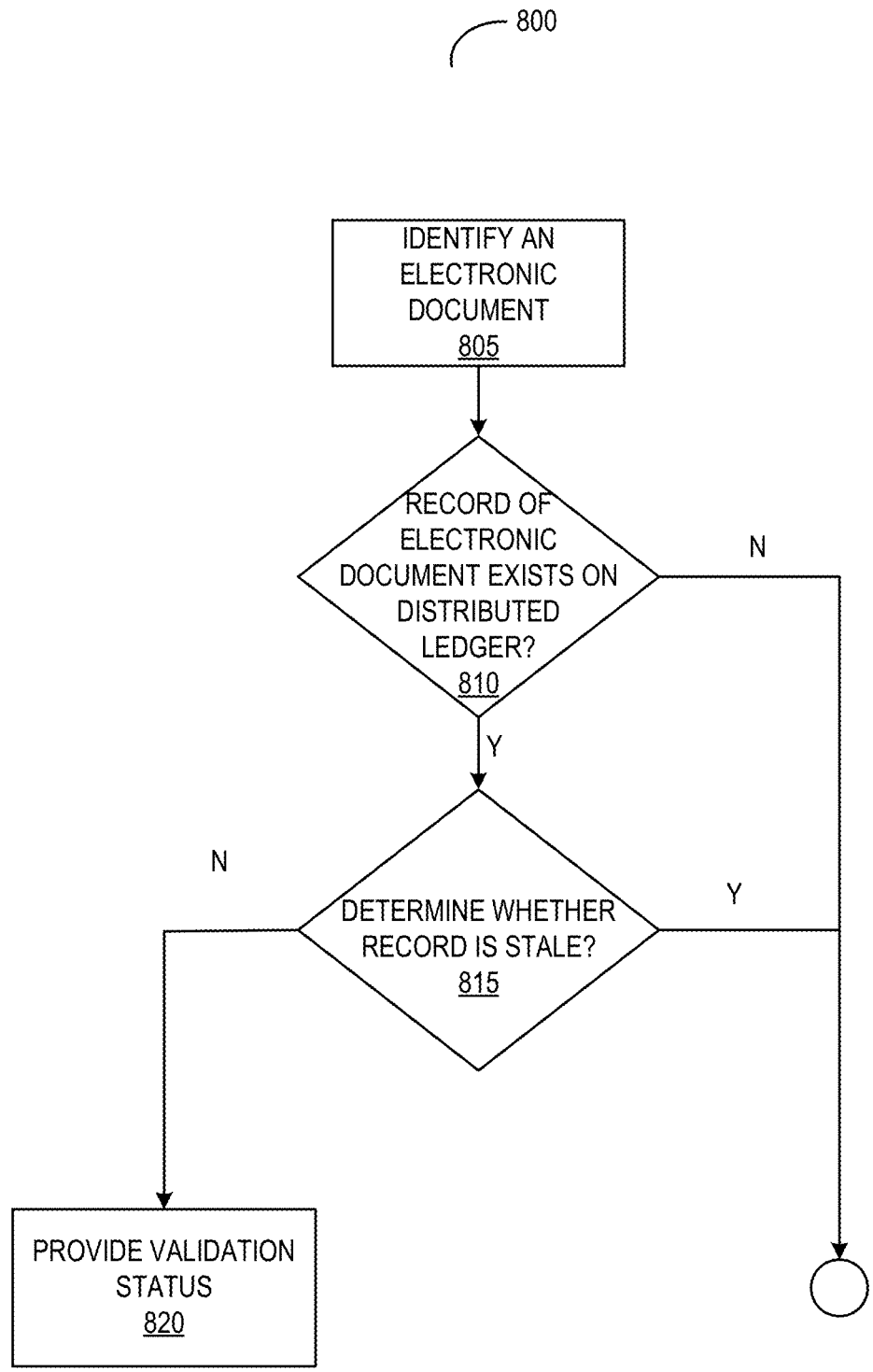
FIGS. 8A-8B illustrate flow diagrams of an example method of validating electronic documents with an embodiment.
Figure 8B:
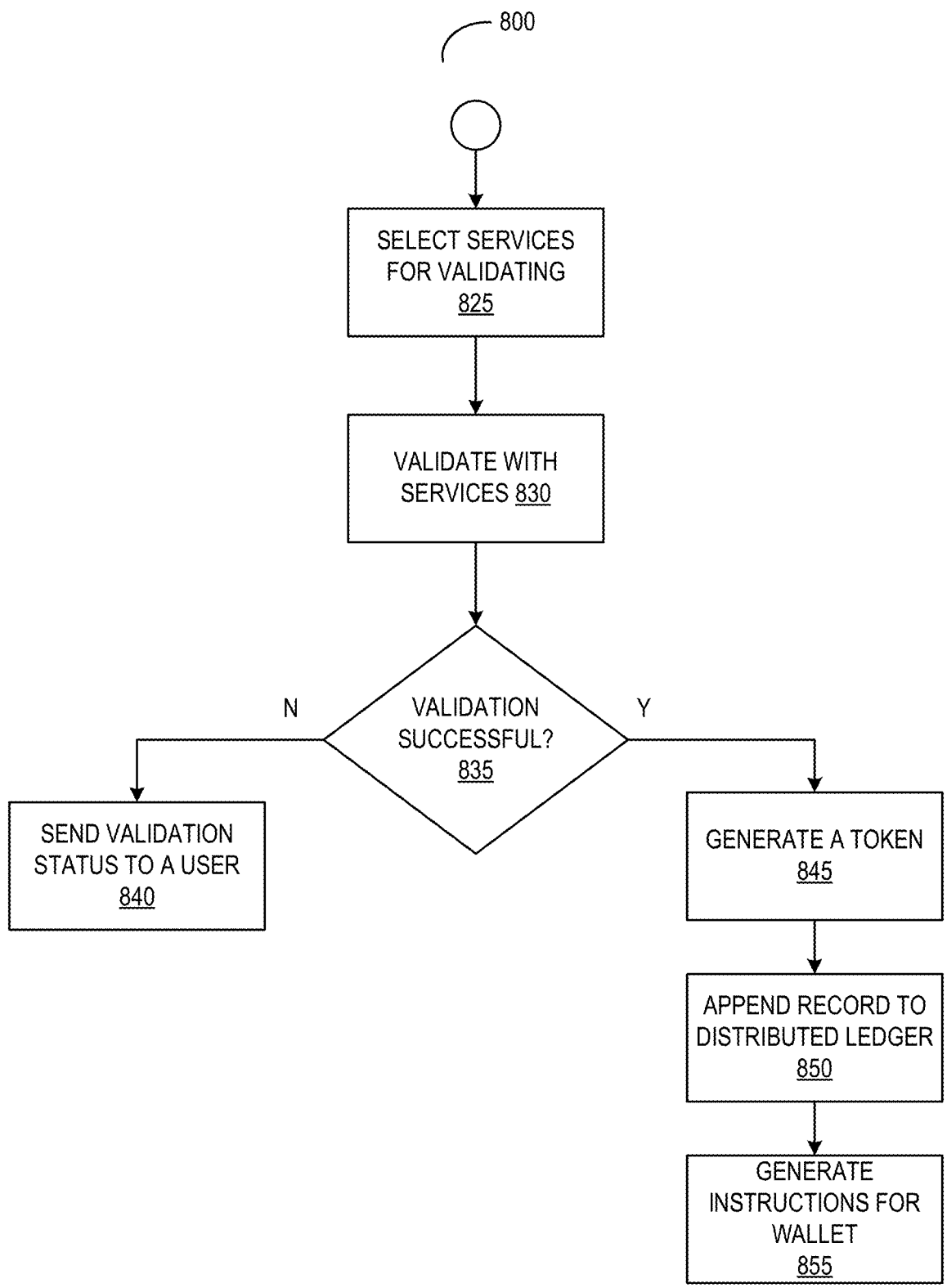

FIGS. 8A-8B depict a flow diagram of an example method of validating electronic documents. Embodiments may include additional, fewer, or different operations from those described in the method 800. The method 800 may be performed by a server (e.g., a first server in this example) executing machine-readable software code, though it should be appreciated that the various operations may be performed by one or more computing devices and/or processors. For example, the method 800 may be performed by the document validation system as detailed herein.

At step 805, the first server identifies an electronic document. The first server may identify an electronic document for validation from a customer device. At step 810, the first server determines whether a record of the electronic document exists in a distributed ledger. The first server may determine whether the record of the electronic document corresponds to any of a plurality of records in the distributed ledger.

At step 815, the first server determines whether the record of the electronic document is stale. The first server may identify the electronic document corresponding to a second record of the plurality of records of the distributed ledger as stale based on the time of addition of the second record to the distributed ledger.

At step 820, if the record of the electronic document is not stale, the first server provides the validation status of the electronic document to the customer device. The first server may determine that a second electronic document corresponds to a second record of the plurality of records in the distributed ledger. The first server may send an indication of a validation status for the electronic document identified by the second record.

At step 825, if the record of the electronic document is stale, the first server selects services for validating the electronic document. The first server may determine that the electronic document complies with a rule set defined for at least one of a location, an association, or the customer device. In response to determining that the electronic document complies with the rule set, the first server may receive a selection criterion for validation of the electronic document from the customer device. In some implementations, the first server may select a plurality of second servers with which to communicate from a plurality of third servers based on the selection criterion provided by the customer device.

At step 830, the first server validates the record of the electronic document with services. The first server may validate the record of the electronic document by communicating associated data to the plurality of second servers. In some implementations, communicating with the plurality of second servers may include sending data associated with the electronic document to each of the plurality of second servers. The data may include, but not be limited to, a key to decrypt the electronic document, an identifier of the electronic document, and a signature generated by the first server for the electronic document, among others.

At step 835, the first server determines whether the validation of the electronic document was successful. The first server may receive the consensus result from the plurality of second servers, indicating that consensus has been achieved and that a majority of peer participants (or second servers) have accepted the proposal.

At step 840, if the validation of the record is not successful, the first server sends a validation status to a user. At step 845, upon successful validation of the record by the plurality of second servers, the first server generates a non-fungible token. The first server may generate a token using the electronic document in response to the plurality of second servers successfully validating the record of the electronic document. The first server may generate a new record for each token. The new record may be intricately linked to its corresponding electronic document. Each token may serve as a unique identifier for its respective record.

At step 850, the first server appends the record (or new record) of the electronic document to the distributed ledger. Upon record generation, the first server may authenticate the record. The first server may append the record to the distributed ledger based on the record's ID, timestamp, and other pertinent identifiers.

At step 855, the first sever generates instructions for a wallet of the customer device. The first server may generate an instruction to store the token in the wallet of the customer device to authorize the use of the electronic document across the plurality of second servers. The process of generating the instruction may further include sending the instruction to store the token in the wallet to be used by the customer device to access a resource on at least one of the plurality of second servers associated with the electronic document.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of validating electronic documents, comprising:
    identifying, by a first server, an electronic document of a customer device to be validated for use across a plurality of second servers;
    determining, by the first server, that the electronic document complies with a rule set for the plurality of second servers;
    communicating, by the first server, data associated with the electronic document with the plurality of second servers, responsive to determining that the electronic document complies with the rule set;
    validating, by the first server via communication of the data with the plurality of second servers, a record of the electronic document to be appended to a plurality of records on a distributed ledger in accordance a consensus algorithm;
    generating, by the first server, responsive to the plurality of second servers successfully validating the record of the electronic document, a token using the electronic document;
    appending, by the first server, to the plurality of records on the distributed ledger, the record of the electronic document corresponding to the token;
    generating, by the first server, an instruction to store the token on a wallet of the customer device to authorize the use of the electronic document across the plurality of second servers;
    identifying, by the first server, the electronic document corresponding to a second record of the plurality of records of the distributed ledger as stale based on a time of addition of the second record to the distributed ledger; and
    initiating, by the first server, validation of the electronic document from the customer device, responsive to identifying the electronic document as stale.

2. The method of claim 1, wherein determining that the electronic document complies with the rule set further comprises determining that the electronic document complies with the rule set defined for at least one of a location, an association, or the customer device.

3. The method of claim 1, further comprising:
    receiving, by the first server from the customer device, a selection criterion for validation of the electronic document; and
    selecting, by the first server, from a plurality of third servers, the plurality of second servers with which to communicate based on the selection criterion from the customer device.

4. The method of claim 1, further comprising:
determining, by the first server, that the electronic document does not correspond to any of the plurality of records of the distributed ledger; and
initiating, by the first server, validation of the electronic document from the customer device, responsive to determining that the electronic document does not correspond to any of the plurality of records of the distributed ledger.

5. The method of claim 1, further comprising:
refraining, by the first server, from generating the token, responsive to a failure to validate the electronic document; and
sending, by the first server, to the customer device, an indication of the failure to validate the electronic document.

6. The method of claim 1, further comprising:
generating, by the first server, for each of the plurality of second servers, a respective key to decrypt encrypted data of the electronic document; and
storing, by the first server on a database, the respective key to decrypt for each of the plurality of second servers.

7. The method of claim 1, further comprising:
determining, by the first server, that a second electronic document corresponds to a second record of the plurality of records of the distributed ledger; and
sending, by the first server, an indication of a validation status for the electronic document identified by the second record.

8. The method of claim 1, wherein communicating with the plurality of second servers further comprises sending, to each of the plurality of second servers, the data including at least one of (i) a key to decrypt the electronic document, (ii) an identifier of the electronic document, and (iii) a signature generated by the first server for the electronic document.

9. The method of claim 1, wherein generating the instruction further comprises sending the instruction to store the token on the wallet to be used by the customer device to access a resource on at least one of the plurality of second servers associated with the electronic document.

10. A system for validating electronic documents, comprising:
a first server having one or more processors coupled with memory, the first server configured to:
identify an electronic document of a customer device to be validated for use across a plurality of second servers;
determine that the electronic document complies with a rule set for the plurality of second servers;
communicate data associated with the electronic document with a plurality of second servers, responsive to determining that the electronic document complies with the rule set;
validate, via communication of the data with the plurality of second servers, a record of the electronic document to be appended to a plurality of records on a distributed ledger in accordance a consensus algorithm;
generate, responsive to the plurality of second servers successfully validating the record of the electronic document, a token using the electronic document;
append, to the plurality of records on the distributed ledger, the record of the electronic document corresponding to the token;
generate an instruction to store the token on a wallet of the customer device to authorize the use of the validated electronic document across the plurality of second servers;
identify the electronic document corresponding to a second record of the plurality of records of the distributed ledger as stale based on a time of addition of the second record to the distributed ledger; and
initiate validation of the electronic document from the customer device, responsive to identifying the electronic document as stale.

11. The system of claim 10, wherein the first server is further configured to determine that the electronic document complies with the rule set defined for at least one of a location, an association, or the customer device.

12. The system of claim 10, wherein the first server is further configured to:
receive, from the customer device, a selection criterion for validation of the electronic document; and
select, from a plurality of third servers, the plurality of second servers with which to communicate based on the selection criterion from the customer device.

13. The system of claim 10, wherein the first server is further configured to:
determine that the electronic document does not correspond to any of the plurality of records of the distributed ledger; and
initiate validation of the electronic document from the customer device, responsive to determining that the electronic document does not correspond to any of the plurality of records of the distributed ledger.

14. The system of claim 10, wherein the first server is further configured to:
refrain from generating the token, responsive to a failure to validate the electronic document; and
send, to the customer device, an indication of the failure to validate the electronic document.

15. The system of claim 10, wherein the first server is further configured to:
generate, for each of the plurality of second servers, a respective key to decrypt encrypted data of the electronic document; and
store, on a database, the respective key to decrypt for each of the plurality of second servers.

16. The system of claim 10, wherein the first server is further configured to:
determine that a second electronic document corresponds to a second record of the plurality of records of the distributed ledger; and
send an indication of a validation status for the electronic document identified by the second record.

17. The system of claim 10, wherein the first server is further configured to send, to each of the plurality of second servers, the data including at least one of (i) a key to decrypt the electronic document, (ii) an identifier of the electronic document, and (iii) a signature generated by the first server for the electronic document.

18. The system of claim 10, wherein the first server is further configured to send the instruction to store the token on the wallet to be used by the customer device to access a resource on at least one of the plurality of second servers associated with the electronic document.

* * * * *